INVENTOR
Jack F. Fleming
BY Orin R. Severn
his ATTORNEY

United States Patent Office 2,824,309
Patented Feb. 25, 1958

2,824,309

SUNGLASSES FOR PROTECTING THE EYES FROM SUN RAYS DIRECTED TO THE SIDE OF THE HEAD

Jack F. Fleming, Summit, N. J., assignor to Curtiss-Wright Corporation, Plastics Division, a corporation of Delaware Application February 9, 1955, Serial No. 487,031

1 Claim. (Cl. 2—14)

My invention relates to sunglasses and more particularly to sunglasses adapted for protecting the eyes from harmful sun rays directed to the side of the head.

The usual type of sunglasses protect the wearer only from sun rays which are directed to the front of the head, and sun rays pass through open sides of the glasses to impinge on the eyes either directly or indirectly after reflection from the inner surface of the lenses. This is both harmful to the eyes and annoying to the wearer. Attempts have been made to remedy this condition as for example by adding tinted side pieces to the temple bars of the sunglasses for cutting out the rays from the side. The result, however, is rather unsatisfactory since only limited protection is offered by these side pieces and they detract from the overall appearance of the glasses. Furthermore, more parts are required to construct such a pair of glasses as compared to the usual type of sunglasses, and increased production time and increased costs are involved.

It is a prime object of my invention to provide a pair of sunglasses of simple construction and attractive appearance particularly adapted to protect the eyes from the harmful and annoying effects of sun rays directed to the side of the head.

The invention will be more fully set forth in the following description referring to the accompanying drawing and the features of novelty will be pointed out with particularity in the claim annexed to and forming a part of this specification.

Figure 1:
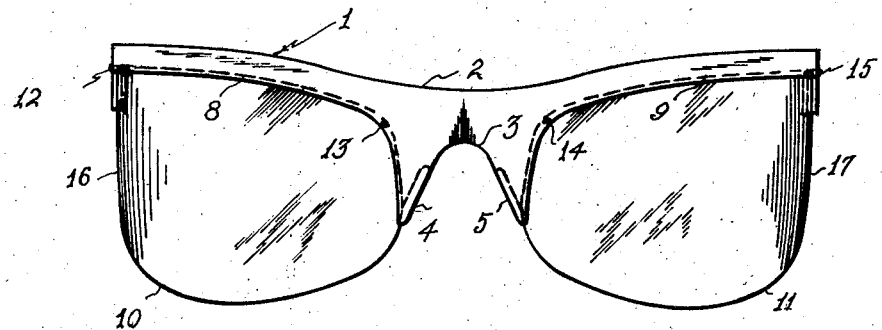
Figure 2:
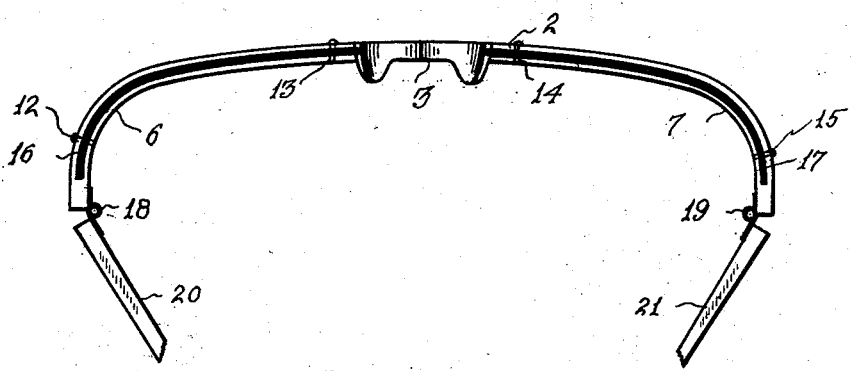
Figure 3:
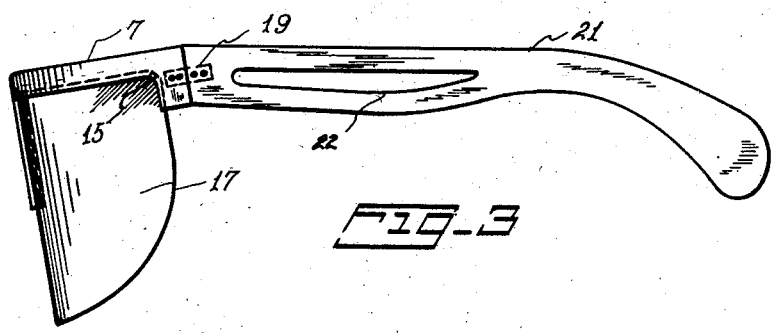

Referring to the drawing, Fig. 1 is a front view of a pair of sunglasses which are constructed according to the features of my invention. Fig. 2 is a bottom edge view of the sunglasses shown in Fig. 1. Fig. 3 is a side view of the sunglasses of Fig. 1.

Referring to the drawings, reference character 1 designates a pair of sunglasses embodying my inventive ideas. The sunglasses include a one-piece frame 2 of suitable plastic material, as for example cellulose acetate, with an integral bridge 3, and nose pads 4 and 5. The frame 1 is generally curved at the front of the glasses as shown in Fig. 2 to more or less follow the contour of the brow, and has end portions 6 and 7 which are sharply curved to extend around the head of the wearer in the region of the temples. The frame is provided with grooves 8 and 9 on opposite sides of the bridge 3 to receive the upper peripheral edges of lenses 10 and 11 respectively which are contoured to follow the curvature of the frame. The lenses are set in the grooves 10 and 11 and secured through the frame in some suitable manner as for example the rivets extending through the frame and lenses at 12 and 13 on one side of the bridge and 14 and 15 on the other side of the bridge. The lenses extend in the grooves 8 and 9 almost to the extreme ends of the frame 1 to provide the lens side portions 16 and 17 which extend about the side of the head and protect the eyes of the wearer from sun rays coming from the side. The lenses may be tinted in any suitable manner and may be formed of any suitable material having desirable optical qualities. Plastic lenses are preferable, however, because of the comparative ease with which they may be formed to the desired contour.

The ends of the frame 2 are provided with hinges 18 and 19 for mounting temple bars 20 and 21 respectively each of which has an elongated portion cut out as at 22 resulting in a saving in material and a reduction in weight. The temple bars when fully extended on the hinges are in substantially the same plane as the extreme end portions of the frame 1. The temple bars and frame are connected in such a manner by the hinges 18 and 19 that the top edge of the frame (see Fig. 3) extends downwardly with respect to the top edge of the temple bar to maintain the lower edges of the lenses in fairly close proximity thereto. The eyes are thereby protected against light which might otherwise pass under the glasses and impinge against the eyes.

Glasses such as described having side pieces which are integral portions of the lenses may be constructed very simply. The resulting glasses are also both attractive, and are particularly effective for protecting the eyes of the wearer from the harmful rays of the sun directed to the head of the wearer from the side. It should be pointed out that the construction herein described as affording these advantages may be modified in any number of ways within the scope of the invention; for example, instead of providing separate lenses a frame may be provided which is adapted to receive a single piece lens construction having end portions which extend around the side of the head at the temples. Also the frame and lenses might conceivably be molded of suitable plastic material in a single piece thus eliminating the necessity for securing separate lenses to the frame.

Accordingly it should be understood that this invention is not limited to specific details of construction and arrangement thereof herein illustrated, and that changes and modifications may occur to one skilled in the art without departing from the spirit of the invention.

What is claimed is:

A pair of sunglasses including a frame comprising two brow portions and a bridge portion integral with and interconnecting said brow portions, each said brow portion being formed to extend substantially straight across the brow of the wearer and to curve sharply toward the temple to extend about the side of the head, the bottom edge of each brow portion and each outer lateral edge of the bridge portion being grooved; and a pair of lenses each having its upper and inner edges secured in the associated grooves in brow portion and bridge portion, respectively, with its remaining edge portions free, and each lens being curved to extend about the sides of the head in the manner defined by the frame for protecting the eyes from sun rays or foreign objects directed to the side of the head.

References Cited in the file of this patent

UNITED STATES PATENTS

| | | |
|---|---|---|
| 2,506,956 | Gomez | May 9, 1950 |
| 2,508,870 | Splaine | May 23, 1950 |
| 2,527,027 | Mull | Oct. 24, 1950 |
| 2,534,655 | Baratelli | Dec. 19, 1950 |
| 2,563,125 | Malcom | Aug. 7, 1951 |